United States Patent Office 3,286,962
Patented Nov. 22, 1966

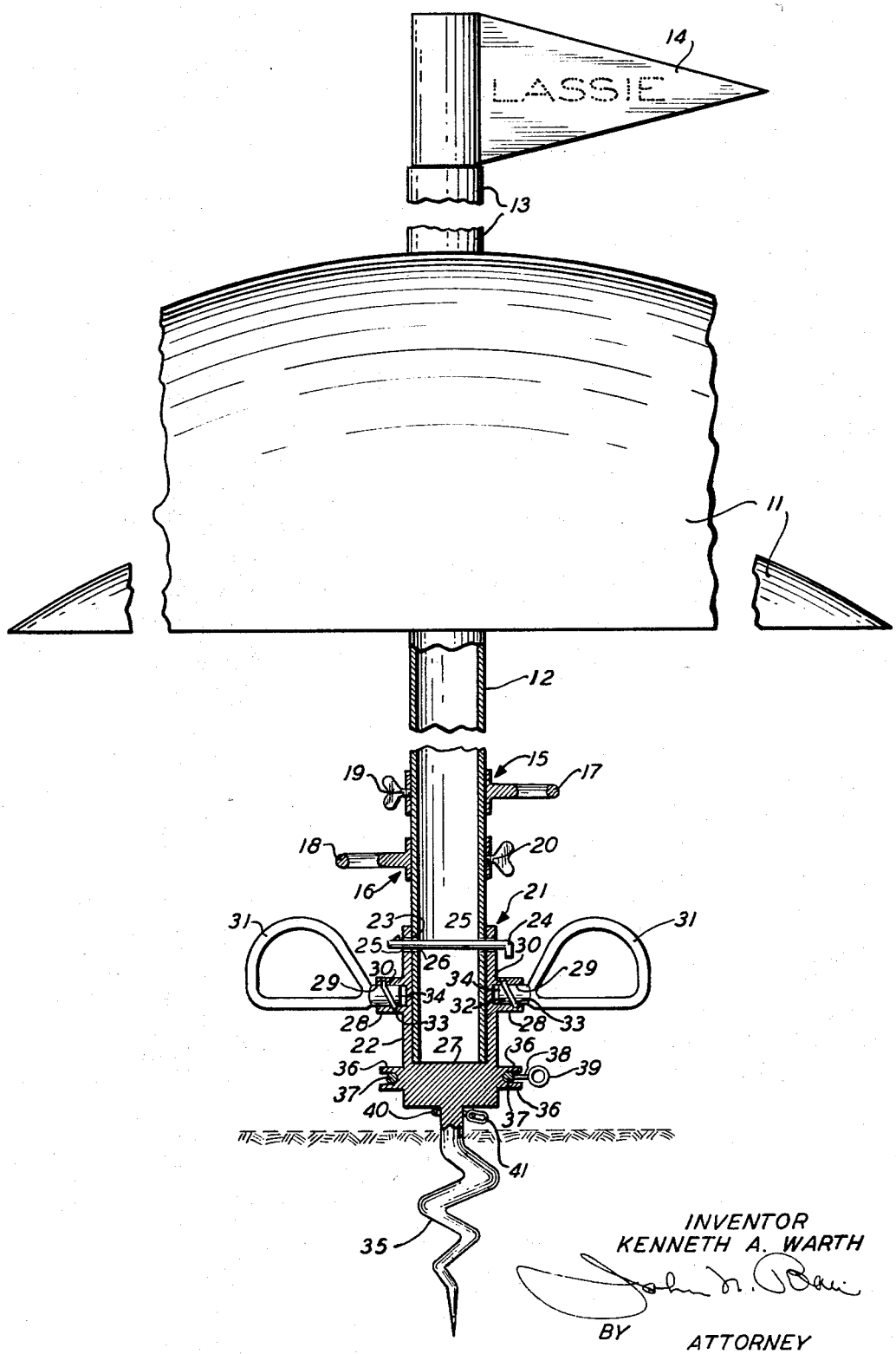

3,286,962
DOG UMBRELLA
Kenneth A. Warth, 3911 Liberty Ave., North Bergen, N.J.
Filed Nov. 26, 1965, Ser. No. 509,849
8 Claims. (Cl. 248—44)

My invention relates to umbrellas generally and specifically to a dog umbrella adapted to protect the dog against the sun, provide food and water and to provide means for securing the dog against wandering.

During hot weather, it is cruel to tie a dog in the sun. Yet, frequently there is no way to secure a dog unattended for a long period without eventually forcing him to remain in the sun due to the movement thereof. In addition, available means for securing the dog leash frequently permit fouling of the leash, progressive shortening thereof and ultimate restriction of movement of the dog even to the point of binding him practically to the ground. These problems become more acute when one attempts to use temporary securing means in unfamiliar areas which may be forced upon the dog owner when travelling or on vacation.

Therefore, it is among the objects and advantages of my invention to provide a dog umbrella which will protect the dog against the sun and which also provides means for supplying the dog with both food and water.

Another object of my invention is to provide a dog umbrella which is transportable and which may be quickly and easily secured to the ground by a helical, tapering skewer.

Yet another object of my invention is to provide a dog umbrella having means to secure a dog leash which cannot become fouled.

A further object of my invention is to provide a dog umbrella in which a swivel eye is attached to the skewer body which secures the umbrella to the ground rather than to the relatively thin shaft of the umbrella itself.

Yet another object of my invention is to provide a dog umbrella in which the shaft of the umbrella is detachably secured to the skewer body.

Yet another object of my invention is to provide a dog umbrella in which the skewer body is provided with a pair of detachable handles which facilitate both insertion into the ground and rotation after the initial bite has been established.

These objects and advantages as well as other objects and advantages may be achieved by my invention, one embodiment of which is illustrated in the drawings in which:

FIGURE 1 is a side elevational view of my dog umbrella attached to the skewer body and showing the food receptacles.

Referring now to the drawings in detail, my umbrella comprises a foldable umbrella 11 mounted on a shaft 12. The umbrella 11 may be of any conventional type and may be covered with fabric, plastic or the like. Attached to the top of the umbrella is a second shaft 13 to which a pennant 14 bearing the dog's name is secured.

A pair of ring clamps 15 and 16 are detachably secured to the shaft 12. While I have illustrated a shaft 12 as a tubular member, it may be solid as well. The ring clamps 15 and 16 each define a generally horizontal ring, respectively 17 and 18, adapted to hold food and water trays. Each of the clamps 15 and 16 is secured to the shaft 12 by means of a wing bolt, respectively 19 and 20. The ring clamps 15 and 16 are generally semicircular and may be applied to the shaft 12 and removed therefrom when the shaft is attached to a skewer base 21. The skewer base 21 comprises a body member 22 having a deep, blind bore 23 adapted to receive the end of the shaft 12. The bore 23 is sufficiently deep to seat the shaft 12 securing it from falling sidewardly and thus, becoming disengaged from the skewer base 21. To insure against accidental disengagement of the shaft 12 from the base 21, a lock pin 24 may be passed through holes 25, 25 in the base 21 and holes 26, 26 in the shaft 12. Of course, holes 25, 25 and 26, 26 are in registration with each other when the shaft 12 rests upon the bottom 27 of the bore 23.

The body member 22 is provided with a pair of diametrically opposed, radial enlargements 28, 28 each having a blind bore 29, 29. The blind bore 29 is provided with an internal, generally helical cam way 30. A handle 31, having a cylindrical shaft 32 is rotatably and detachably attached within the blind bore 29. To facilitate attachment, the shaft 32 of the handle 31 is provided with a radially enlarged cam follower 33. When the bottom 34 of the shaft 32 engages the bottom of the bore 29, the handle 31 will be oriented in a generally vertical plane. However, at an intermediate point of attachment, the handles 31, 31 lie in a horizontal plane. Thus, the handles may be rotated within the blind bores 29, 29 until horizontal and then grasped by the hands and forced downwardly to gain an initial bite in the ground. Once the initial bite of the skewer 35 has been effected, the handles may then be further rotated until in a vertical plane to facilitate rotation to cause the skewer 35 to penetrate deeper.

Of course, it must be born in mind, that the helical cam way 30 could be replaced by a cam way which is initially longitudinal, parallel to the axis of the bore 29, and then circular in a plane perpendicular to the axis of the bore 29.

At a point near the bottom of the skewer base 21, are a pair of parallel, generally horizontal, radial flanges 36, 36. A ring 37 is rotatably seated between the flanges 36, 36. A shaft 38 connects the ring 36 to a smaller ring 39 adapted to attach to a dog chain.

In the alternative, a simple ring 40 may be placed over the skewer 35 and pushed to the topmost portion thereof immediately beneath the base 21. A second ring 41 is interlocked with the ring 40 for attaching a dog chain.

Of course, ring 37 illustrated in the drawings as well as ring 40 illustrated as an alternative structure are adapted to rotate to prevent shortening or fouling of the dog chain as the dog circles the base 21.

It should be noted, that my skewer base 21 may be manipulated by the handles 31, 31 thereby forcing the skewer 35 into the ground, while the pole 12 is disconnected therefrom. This is extremely important, since one frequently must force the skewer 35 into hard or rocky ground which requires great force. Such force can only be conveniently applied if the operator is not impeded by the shaft 12 of the umbrella. In addition, it should be noted that the handles 31, 31 are flat on their bottoms when oriented in a vertical plane so that they may lie close to the ground and yet still be employed to rotate the base 21.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:
1. A dog umbrella comprising,
 (a) a foldable umbrella,
 (b) a shaft depending from the umbrella,

(c) a generally helical, tapering skewer detachably secured to the end of the shaft opposite the umbrella,
(d) a pair of diametrically opposed handles on the skewer, and
(e) means on the skewer for securing a dog chain thereto.

2. A dog umbrella comprising,
(a) the structure in accordance with claim 1, and
(b) means for supporting food trays detachably secured to the shaft.

3. A dog umbrella comprising,
(a) the structure in accordance with claim 1, in which
(b) the handles are detachably secured to the skewer.

4. A dog umbrella comprising,
(a) the structure in accordance with claim 1 in which
(b) the means for securing the dog chain are,
(c) a swivel eye attached to the skewer.

5. A dog umbrella comprising,
(a) the structure in accordance with claim 1, and
(b) a skewer body having a blind bore in its top, the shaft being seated within the bore, and
(c) the helical skewer depending from the bottom of the skewer body.

6. A dog umbrella comprising,
(a) the structure in accordance with claim 1 in which,
(b) the means for securing the dog chain are,
(c) a pair of parallel, spaced apart radial flanges on the skewer and,
(d) a ring rotatably seated between the flanges.

7. A dog umbrella comprising,
(a) the structure in accordance with claim 1 and,
(b) a skewer body,
(c) a pair of diametrically opposed, radial enlargements having a blind bore extending radially outwardly with respect to the skewer body,
(d) a handle detachably seated in each bore,
(e) each handle having a shaft seated in the bore and an extension extending radially outwardly from the shaft.

8. A dog umbrella comprising,
(a) the structure in accordance with claim 7 and,
(b) a generally helical cam-way in each bore and,
(c) a radially cam follower on the shaft of each handle seated within the cam way, the cam way permitting both a vertical and horizontal orientation of the handle with respect to the skewers.

References Cited by the Examiner

UNITED STATES PATENTS

| | | | |
|---|---|---|---|
| 2,209,504 | 7/1940 | Beiter | 248—44 |
| 2,211,283 | 8/1940 | Mercer | 248—44 |
| 2,554,887 | 5/1951 | Tricarico | 248—44 |
| 2,643,843 | 6/1953 | Brown | 248—156 |

CLAUDE A. LE ROY, *Primary Examiner.*